(12) United States Patent
Zappala (10) Patent No.: US 7,333,794 B2
(45) Date of Patent: Feb. 19, 2008

(54) REAL-TIME NETWORK ANALYSIS AND PERFORMANCE MANAGEMENT

(75) Inventor: Charles S. Zappala, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 405 days.

(21) Appl. No.: 10/090,265

(22) Filed: Mar. 4, 2002

(65) Prior Publication Data

US 2002/0127993 A1   Sep. 12, 2002

Related U.S. Application Data

(60) Provisional application No. 60/273,739, filed on Mar. 6, 2001.

(51) Int. Cl.
*H04M 11/04* (2006.01)

(52) U.S. Cl. .............. 455/404.1; 455/404.2; 455/456.1; 455/457; 455/67.11; 455/67.14

(58) Field of Classification Search ............ 455/404.2, 455/404.1, 456.5, 456.1, 456.2, 456.6, 414.1, 455/422.1, 67.11, 67.14, 567
See application file for complete search history.

(56) References Cited

U.S. PATENT DOCUMENTS

| | | | | |
|---|---|---|---|---|
| 5,095,500 | A * | 3/1992 | Tayloe et al. ............ | 379/32.01 |
| 5,719,563 | A | 2/1998 | Thompson, Jr. | |
| 5,926,762 | A | 7/1999 | Arpee et al. | |
| 6,014,565 | A | 1/2000 | Bonta | |
| 6,141,565 | A | 10/2000 | Feuerstein et al. | |
| 6,256,503 | B1 * | 7/2001 | Stephens ................. | 455/456.6 |
| 6,356,758 | B1 * | 3/2002 | Almeida et al. ............ | 455/446 |
| 6,363,255 | B1 * | 3/2002 | Kuwahara ............... | 455/456.5 |
| 6,366,780 | B1 * | 4/2002 | Obhan ........................ | 455/453 |
| 6,374,099 | B1 * | 4/2002 | Bi et al. .................. | 455/404.1 |
| 6,408,172 | B1 * | 6/2002 | Alperovich et al. ...... | 455/404.1 |
| 6,463,290 | B1 * | 10/2002 | Stilp et al. ............... | 455/456.1 |

(Continued)

FOREIGN PATENT DOCUMENTS

DE   199 20 587 A1   11/2000

(Continued)

OTHER PUBLICATIONS

"TEMS™ Automatic Autonomous Network Monitoring System," Ericsson NetQual Inc. Advertising brochure, 2001.

(Continued)

*Primary Examiner*—George Eng
*Assistant Examiner*—Huy Phan
(74) *Attorney, Agent, or Firm*—Woodcock Washburn LLP (57) ABSTRACT

Disclosed embodiments include a method for analyzing the performance of a wireless communications network and adjusting parameters in the wireless communications network. In one embodiment, the specific location of a mobile unit is linked with performance data obtained from the mobile unit. In another embodiment, specific mobile units are queried, by, e.g. a network switch, to provide specific performance data. The mobile units respond by sending the performance data and location data to the switch. The performance data and location data are linked. The linked performance data and location data are processed and analyzed to give an accurate representation of network performance from the subscriber's point of view. In one embodiment, E911 technology is used to provide location data.

8 Claims, 8 Drawing Sheets

U.S. PATENT DOCUMENTS

| | | | | |
|---|---|---|---|---|
| 6,522,733 | B1* | 2/2003 | Cook | 379/112.06 |
| 6,522,888 | B1* | 2/2003 | Garceran et al. | 455/456.3 |
| 6,603,966 | B1* | 8/2003 | Sheffield | 455/423 |
| RE38,267 | E* | 10/2003 | Borbowski et al. | 455/456 |
| 6,662,014 | B1* | 12/2003 | Walsh | 455/456.2 |
| 6,741,843 | B1* | 5/2004 | Kalliokulju et al. | 455/226.1 |
| 6,771,956 | B1* | 8/2004 | Beeler | 455/423 |
| 6,771,977 | B1* | 8/2004 | Campbell | 455/522 |
| 6,819,929 | B2* | 11/2004 | Antonucci et al. | 455/445 |
| 6,970,702 | B1* | 11/2005 | Martin | 455/424 |
| 2001/0022558 | A1* | 9/2001 | Karr et al. | 342/450 |
| 2001/0039489 | A1* | 11/2001 | Ford et al. | 704/1 |
| 2002/0054667 | A1* | 5/2002 | Martinez | 379/45 |
| 2002/0077116 | A1* | 6/2002 | Havinis et al. | 455/456 |
| 2004/0038687 | A1* | 2/2004 | Nelson | 455/456.1 |

FOREIGN PATENT DOCUMENTS

| | | |
|---|---|---|
| EP | 0 431 956 A2 | 6/1991 |
| EP | 1 021 055 A2 | 7/2000 |
| EP | 1 081 972 A2 | 3/2001 |
| WO | WO 99/12228 * | 11/1999 |

OTHER PUBLICATIONS

Walley, Wayne, "Increasing Cell Traffic Breeds Static," *Global Telephony*, Jul. 2, 2001, Intertec Publishing Corporation at ScoreBoard website, http://www.google.com/search?q=cache:ma9c4QEwEGo:www.merrittgrp.com/articles2.cfm?clientid=25&artid=359.

"ScoreBoard and Schema Settle Patent Infringement Lawsuit," ScoreBoard website, Press Release, Sep. 24, 2001, http://www.scoreboardinc.com/news/ShowRelease.cfm?Release=95, downloaded Dec. 13, 2001.

"Products and Services," ScoreBoard Website, http://www.scoreboardinc.com/products/index.cfm, downloaded Dec. 13, 2001.

"Data Management," ScoreBoard Website, http://www.scoreboardinc.com/products/process/dataManagement.cfm, downloaded Dec. 13, 2001.

"Analysis," ScoreBoard Website, http://www.scoreboardinc.com/products/process/analysis.cfm, downloaded Dec. 13, 2001.

"Optimization," ScoreBoard Website, http://www.scoreboardinc.com/products/process/optimization.cfm, downloaded Dec. 13, 2001.

"TEMS™ Optimization Solutions," Ericsson Website, http://www.ericsson.com/tems/, downloaded Dec. 13, 2001.

"TEMS™ Automatic TDMA," Ericsson Website, http://www.ericsson.com/tems/tdma/automatic-tdma.shtml, downloaded Dec. 13, 2001.

ScoreBoard Inc. "Peak Performance for the Mobile Industry[SM]" http://www.scoreboardinc.com/products/process/dataManagement.cfm (Dec. 15, 2001).

WatchMark Corporation "Mobile Call Analyzer" http://www.watchmark.com/products/mca.html (Dec. 15, 2001).

WatchMark Corporation "Mobile Call Analyzer" http://www.watchmark.com/products/mca_tech.html (Dec. 15, 2001).

WatchMark Corporation "WatchMark™ Pilot Visualization and Decision-Support Product" http://www.watchmark.com/products/pilot.html (2001).

* cited by examiner

REAL-TIME NETWORK ANALYSIS AND PERFORMANCE MANAGEMENT

CROSS-REFERENCE TO RELATED APPLICATION

This application claims the benefit of U.S. Provisional Patent Application No. 60/273,739, filed Mar. 6, 2001.

BACKGROUND

The disclosed embodiments relate to analyzing the performance of a wireless communications network and adjusting parameters in the wireless communications network. Wireless communications systems using cellular or Personal Communication Services (PCS) devices vary in performance from the point of view of the device user. For example, a cellular phone user may experience very good call quality or less than satisfactory call quality depending upon location and/or time of day. Entities that design, construct, and maintain wireless communications networks are very motivated to provide the best service to as many users as possible all of the time. This can be difficult due to the nature of the networks. For example, there is a finite number of physical network components, such as cell sites, PCS sites (or base stations) and repeaters in the network. The location of the components affects the performance of the network. The assignment of network parameters, such as power of individual network components, and frequencies assigned to geographical areas, also affects the performance of the network. Assigning network parameters is challenging because there is no static solution. Factors such as varying use of the network over time require the finite resources to be distributed differently over time to maximize performance for current users. The "best" network configuration is thus a moving target. Because the experience of the end user is what really matters, performance engineers attempt to collect and analyze data that reflects the end user's experience of the network.

Traditional approaches to network analysis are very expensive and time consuming. In addition, traditional approaches do not allow the network administrator to react very quickly to network deficiencies. One traditional method of collecting network performance data is drive testing. Drive testing involves a truck full of sophisticated equipment driving through areas covered by a wireless network service provider. A performance engineer on the truck utilizes special equipment to make test calls makes a call to a fixed location. The equipment can send a variety of performance data to the fixed location on demand. During the call, the fixed location collects performance data from the telephone and the network, such as signal strength, and other measures. Thus, data collected by drive testing provides a fairly precise location for data gathered. The data collected can be associated with the general area the truck is passing through, and thus the mobile data reflects the user's experience in the wireless network. Data collected by drive testing is analyzed to determine adjustments to be made to the network parameters. Changes to network parameters include increasing the power of certain components to reduce the number of dropped calls, reducing the transmitting power to reduce interference, and changing frequency assignments to cell site and sectors.

Traditional drive testing is very expensive. Also, it can be too expensive to gather enough data to be statistically relevant. Another disadvantage is that gathering data can take so long that the data is not very useful. Obviously, a limited number of trucks are deployed at any time, so that any characterization of the network resulting from the drive testing is incomplete. In addition, it takes time to deploy drive testing trucks, collect data, and make network parameter adjustments. By the time the adjustments are made, the network may require different adjustments. In addition, the results of the adjustment are difficult to determine quickly.

Another traditional method of collecting network performance data is using data generated by switch statistics software. Switches in the network routinely capture data related to calls. This data reflects performance of the network, but lacks location information. This method is less expensive than drive testing, and is a faster process. Because of the lack of location information, however, only broad, coarse adjustments can be made based on the data analyzed. Because this method does not enable finer adjustments to be made, or even to be detected, this method is not helpful in solving network performance problems that are not easily seen or are geographically limited.

Efforts have been made to merge the data from the switch and data from drive testing, but this is difficult. Several software vendors sell products that analyze wireless network performance data, display results, and make suggestions regarding network design. The data available still has the limitations discussed above.

Overall, there is a need for improved performance data collection and analysis in wireless communications networks.

Note: the headings provided herein are for convenience and do not necessarily affect the scope or interpretation of the invention.

DETAILED DESCRIPTION

Embodiments of the invention, described below, use the location of a mobile unit in a wireless network when providing operational performance information. A performance engineer then tunes the system for optimal performance without traditional drive testing. In one embodiment, mobile units are equipped with a location system that calculates the absolute location of the mobile unit. The location system may include Federal Communications Commission ("FCC") mandated enhanced 911 ("E911") technology. The mobile unit is further equipped with a performance monitoring system that responds to requests for performance information from a switch. A performance engineer formulates a query or request for information, which may include selected mobile units, selected geographical areas and selected time periods. The query further specifies the data requested. The mobile units implicated by the query respond by sending the performance data and location data to the switch. The performance data and location data are linked. The linked performance data and location data are processed and analyzed in real-time to give a very accurate representation of network performance from the subscriber's point of view. Network parameters can be changed on the fly as data is analyzed, and the results of adjustments can be quickly observed.

Figure 1:
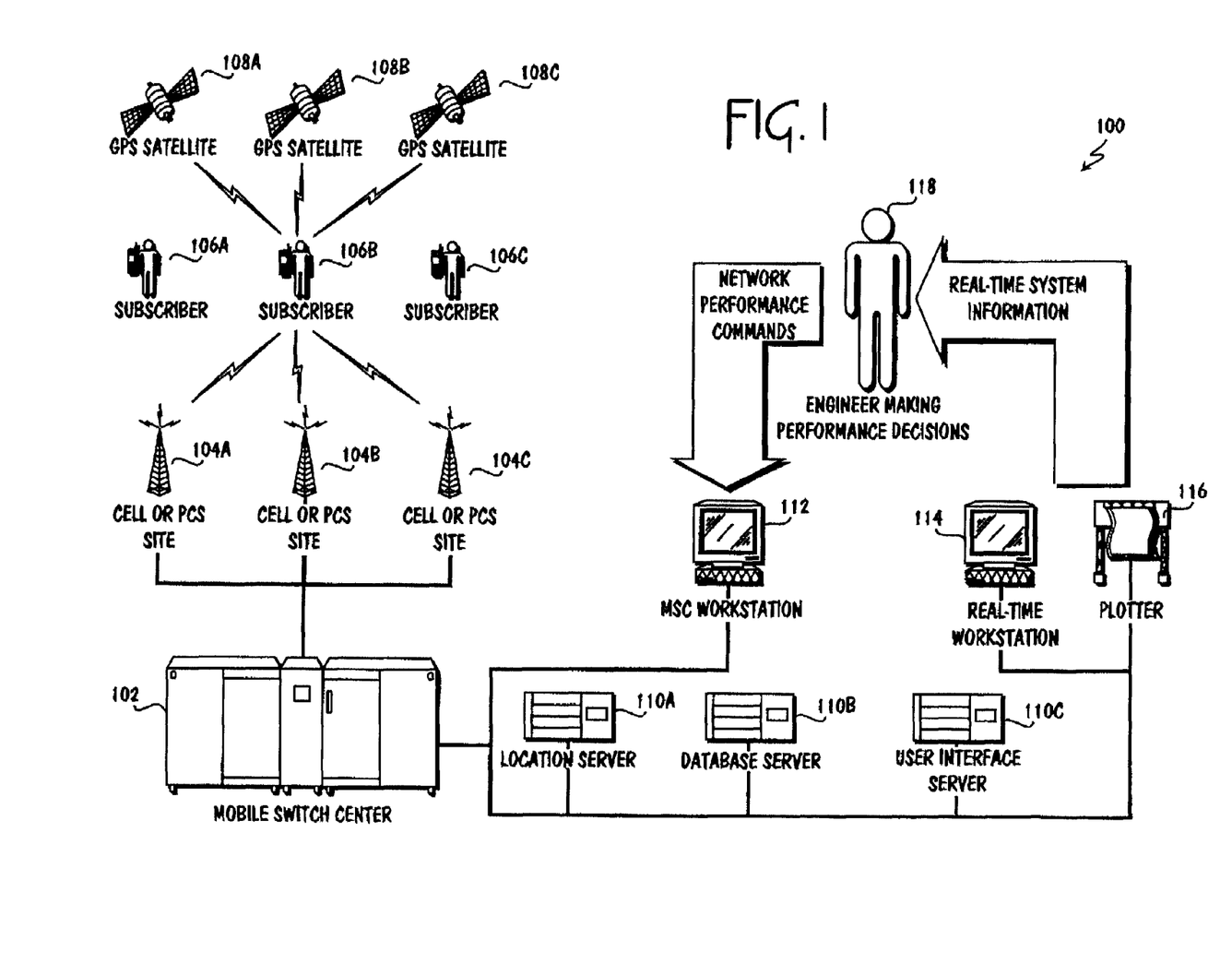
FIG. 1 is a diagram of an embodiment of a real-time network analysis and performance management system.

FIG. 1 is a diagram of an embodiment of a real-time network analysis and performance management system 100. The system 100 includes a mobile switch center 102, also known as switch 102, and servers 110. Servers 110 include location server 110a, database server 110b, and user interface server 110c. The switch 102 and the servers 110 collectively provide data processing and storage. In various embodiments, one server or a number of servers greater than three, could provide all of the data processing and storage capabilities of the switch 102 and the servers 110.

Unless described otherwise herein, the elements depicted in FIG. 1 are well known or described in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in the provisional patent application, or well known to those skilled in the relevant art.

The switch 102 communicates with the cell sites, or PCS sites 104. Sites 104 are also referred to as base stations 104. The base stations 104 are located in different areas within a wireless network and handle communication among mobile units 106, and between the mobile units 106 and other mobile units. The mobile units 106 can be mobile phones, PCS devices, such as personal digital assistants ("PDAs"), or any device that communicates over a wireless network. In the depicted embodiment, the mobile units 106 are Global Positioning System (GPS) enabled. The GPS system uses orbiting GPS satellites, such as GPS satellites 108 to send timing and distance signals directly to a GPS receiver in a GPS enabled device. The precise position of the device is calculated by software on the receiving device. FIG. 1 shows three GPS satellites, 108a, 108b, and 108c. Three GPS satellites are shown in the figure, but preferably as many as eight are used. The GPS satellites 108 transmit to a GPS receiver in a mobile unit 106 as the subscriber carries it around. The GPS signals are used to calculate a device location that is stored in the mobile unit 106 temporarily.

The user interface server 110c provides a user interface run on the real-time workstation 114. An engineer 118 uses the user interface to create queries for the mobile units 106. The switch 102 receives location data and performance data from the mobile units 106 in response to the queries.

The location server 110a receives and stores information regarding the location of the mobile units 106, such as during emergency 911 calls, to thereby enable the E911 technology noted above. In the depicted embodiment, however, the location server 110a obtains location information for some or all mobile units 106, regardless of whether the mobile unit has placed a 911 call. Use of such location servers is known by those skilled in the relevant art. The location server 110a is connected to a workstation 114 (or another workstation, not shown) to facilitate control over the selection criteria of location and call data, or network performance, records. Various selection scenarios can be used. For example, a group of random mobile identification numbers ("MINs") or electronic serial numbers ("ESNs") can be selected. Criteria such as specific base stations, sectors, control channels, traffic channels, latitude and longitude polygons, date, and time criteria can be used to select records.

To be able to manage this large workload, the location server 110a accesses the call data records as quickly as possible without providing a load on the switch 102 itself. The location server 110b is attached to the switch through a dual-port arrangement to a data storage device in the switch 102.

Location and call data records are forwarded for long term storage to the database server 110b. The database server 110b is also connected to the user interface server 110c, which facilitates analysis and presentation of the data to the engineer 118. Location data and network performance data are optionally shown on the real-time workstation 114 or printed by a plotter 116 or other printer. Depending on the capacity of the user interface server 110c, more than one real-time workstation 114 and plotter 116 are supported.

The performance engineer 118 analyzes the location data and network performance data from the system, and decides what system parameter changes, or adjustments, to make. These adjustments are accomplished with the mobile switch center ("MSC") workstation 112, which forwards the adjustments to the switch. These adjustments affect the performance of the network. As continued or new observations are selected, the new data is collected by the real-time system and displayed to the performance engineer 118. The cycle of data collection, data analysis, and system adjustment continues to fine-tune the system 100 further.

In other embodiments, other location systems and methods are used. In one embodiment, existing E911 technology is used to obtain location data. E911 technology includes hardware and software in mobile units, network components or both. Recently, the FCC formulated E911 requirements, which are an enhancement to "basic" wireless 911 emergency services. The FCC previously mandated wireless 911 requirements to improve the quality and reliability of 911 emergency services for wireless phone users. The basic 911 rules require wireless carriers to transmit all 911 call to a public safety answering point ("PSAP") without regard to validation procedures intended to identify and intercept calls from non-subscribers. According to phase II E911 requirements, wireless carriers are required to provide automatic location identification ("ALI"). ALI is implemented with, e.g., ALI capable handsets. There are various methods for obtaining location identification, as further discussed below.

Figure 2:
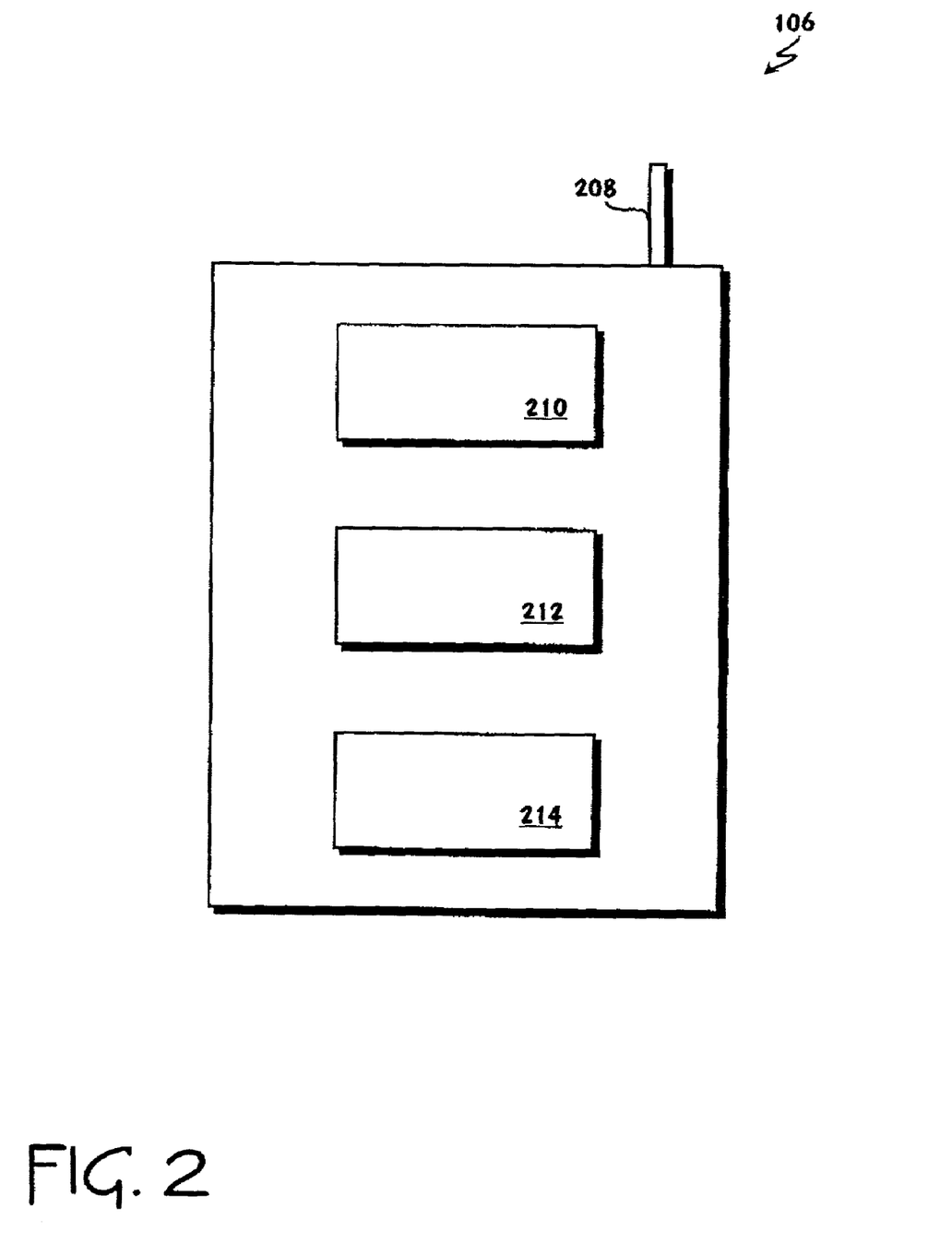
FIG. 2 is a diagram of an embodiment of a mobile unit.

FIG. 2 is a diagram of a mobile unit 106. The mobile unit 106 includes an antenna 208, a mobile unit operating system 210, a location system 212, and a performance monitoring system 214. The mobile unit operating system 210 includes hardware and software required to conventionally operate a mobile communications device. The location system 212 includes hardware and software to derive an absolute location of the mobile unit, such as a GPS receiver and GPS software. The performance monitoring system 214 includes hardware and software to monitor and store various network performance characteristic measurements (such a signal to noise ration, bit error rate, and other performance metrics known to those skilled in the art). The organization and separation of systems by function, as shown in the mobile unit 106, can be varied in other embodiments. For example, other embodiments could have the various hardware and software functions all combined in one system, or divided in a different way.

Figure 3:
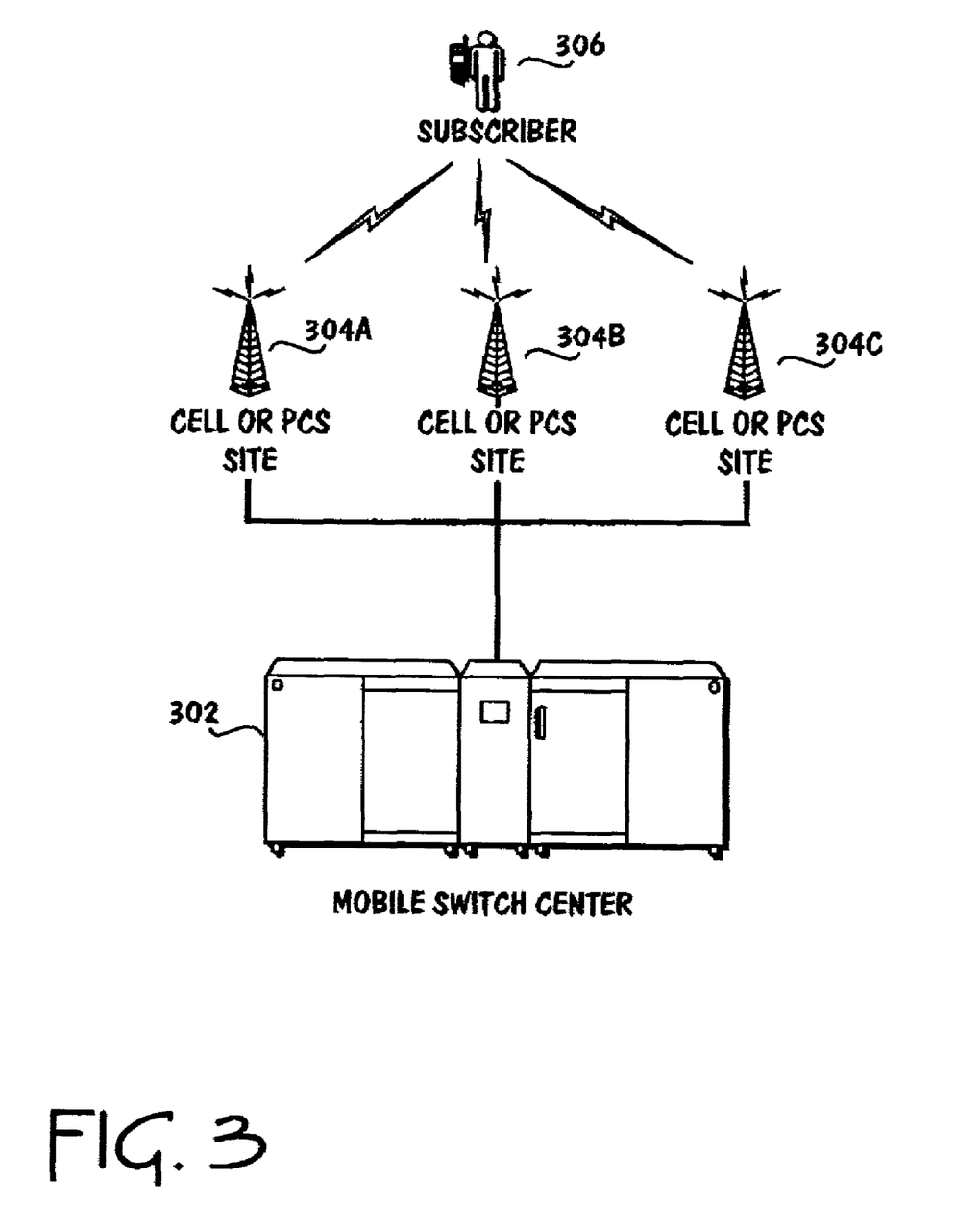
FIG. 3 is a diagram of an embodiment of an alternative location system.

FIG. 3 is a diagram illustrating an embodiment using a different location system from that of FIG. 1. The embodiment of FIG. 3 includes a GPS receiver at each base station 304 of a wireless network. According to well-known methods, the GPS signals to multiple base stations 304 are used to determine the distance of the mobile unit 306 from three or more base stations 304. The mobile unit 306 does not include a GPS receiver, but does include software to send appropriate signals to the base stations 304. The methods include measuring the angle of arrival of the mobile unit 304's signal, and measuring the time difference of arrival ("TDOA") to the base stations 304. Calculated location information is sent as required to the switch 302.

Another example of determining location (not shown) is a "fingerprint method". Because a mobile unit has one current serving base station and several potential serving base stations, the signal strengths from these sources forms a unique multidimensional array of signal strength values. Each array element corresponds to a specific geographical location and can be encoded with a location. Moving the mobile unit changes the array value. The array value translates to a specific location.

Other known methods of determining the location of the mobile unit are possible. In any embodiment, regardless of the method used to determine location, the current base station sends the location data to the switch. The same location data is also captured with the call data records in the switch that are used for subscriber billing.

Figure 4:
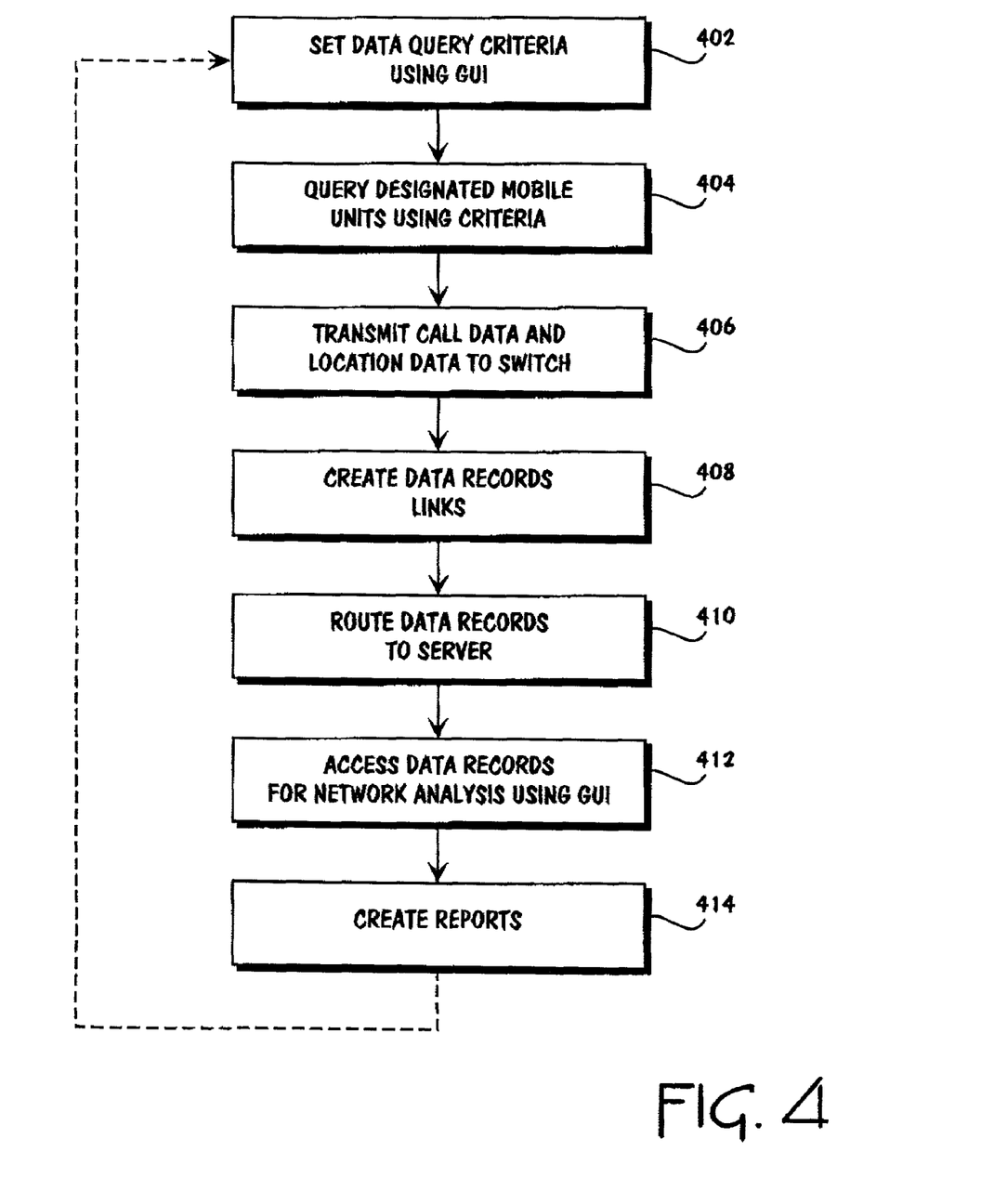
FIG. 4 is a flow diagram of an embodiment of a real-time network performance analysis and management system.

FIG. 4 is a flow diagram illustrating the operation of an embodiment of a real-time network performance analysis and management system. At 402, a performance engineer sets performance monitoring criteria through a graphical user interface ("GUI"). The performance monitoring criteria include two sets of criteria. One set of criteria, the "who criteria", describe which mobile units are queried. The other set of criteria, the "what criteria", describe what performance data is captured. The who criteria include: specific base stations; specific sectors; specific control channels; specific traffic channels; specific latitude and longitude polygons; specific dates or times; random groups of mobile units as identified by phone number; and any other criteria associated with a communication over the wireless network involving a mobile unit. The what criteria include: signal strength; dropped calls; bit error rate ("BER"); and any other conventional performance criteria or metric. At 404, any mobile units implicated by the criteria are queried using the criteria.

At 406, the mobile unit transmits the requested performance data (also known as call data), as well as location data to the switch. The location data describes the location of the mobile unit when the call data was collected. At 408, the location data records and call data records are linked so they can be associated on retrieval. The location data records and call data records are routed to a server for storage at 410.

The stored records are accessed for analysis at 412. The stored location data records and call data records are accessed in several ways, as specified by a performance engineer. For example, records are accessible by query. That is, every record resulting from a particular query is retrieved. Alternatively, records are accessible by one of the "who criteria" or one of the "what criteria". Because the location data records and call records are linked, the appropriate location will be associated with performance data no matter how the records are retrieved.

At 414, reports are created as specified by a performance engineer using specific software. The reports may be graphical or they may be text. For example, a graphical report displays the call data as a function of location and time. The location is a location of the mobile unit with a resolution required by enhanced 911. After viewing the reports, the performance engineer may manually adjust network parameters. Alternatively, a software program takes the report as input and automatically adjusts network parameters according to predetermined instructions. The predetermined instructions specify, for example, permissible ranges of certain network performance measures. The process can be repeated starting with setting network monitoring criteria at 402. The affects of adjustments can be easily and quickly observed by querying mobile units again.

Figure 5:
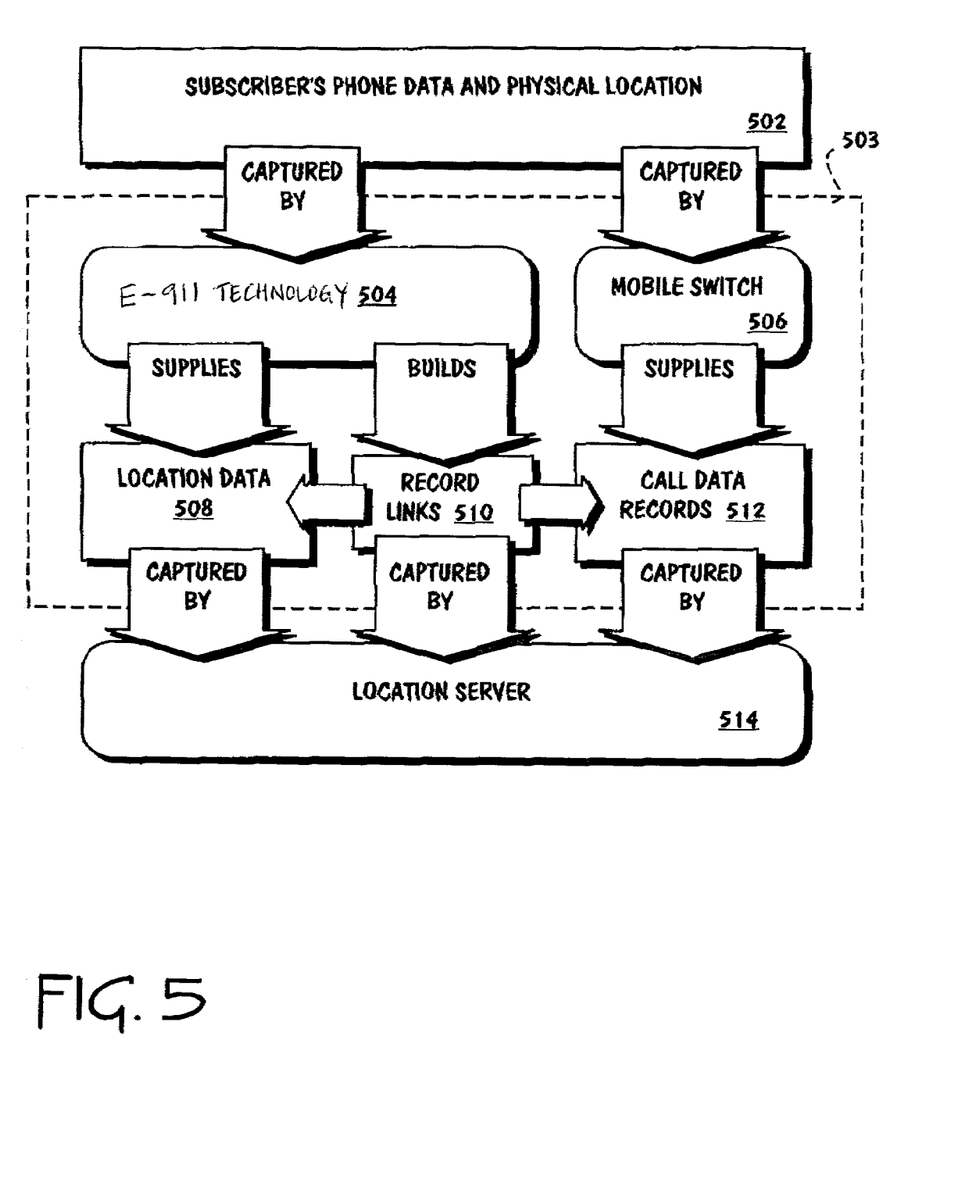
FIG. 5 is a block diagram of a data flow between a mobile unit and servers.

FIG. 5 through FIG. 8 are block diagrams illustrating embodiments of data flows. FIG. 5 illustrates an embodiment of a data flow between a mobile unit and servers. As shown in FIG. 5, the location server 514 simply reads and copies the location data and the associated call data records 502 according to selection criteria. For privacy, the mobile information number (MIN) and the electronic serial number (ESN) contained in the call data records are discarded or simply not copied to the location server 514. The MIN and the ESN are identifiers associated with a mobile mobile unit. Captured date includes, for example, time, location, serving base station, control channel, traffic channel, uplink signal strength, uplink bit error rate, handoff data, etc.

The switch 503 includes conventional mobile switch 506 capability and E911 technology 504. In one embodiment, the E911 technology 504 captures the location data, and the mobile switch 506 captures the call data. The E911 technology 504 creates record links 510 between call data records 512 and location data records 508. The location server 514 captures the location data records 508, the record links 510, and the call data records 512.

Figure 6:
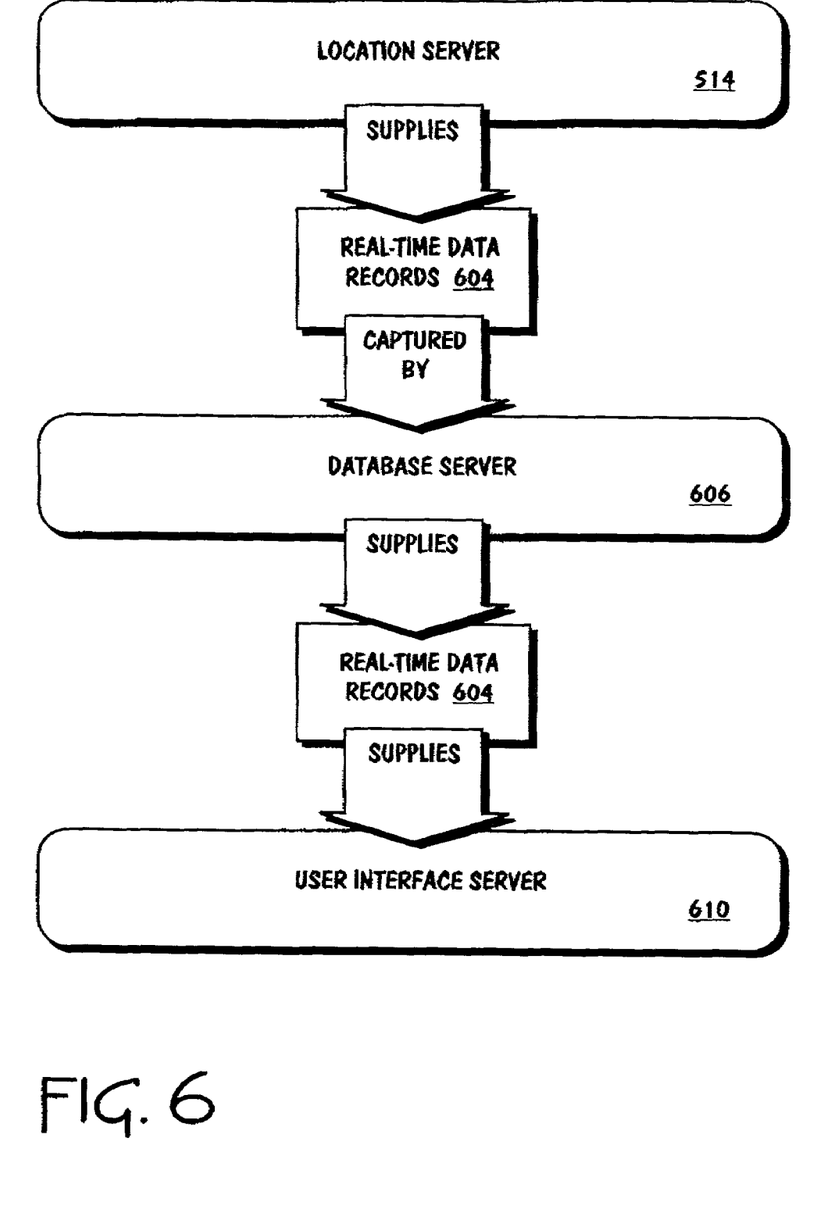
FIG. 6 is a block diagram of a data flow to various servers in one embodiment.

FIG. 6 illustrates an embodiment of data processing flow to various other servers. The location server 514 supplies real-time data records 604. Real-time data records 604 are linked location data records and call data records. The real-time data records are captured by a database server 606, which supplies them to a user interface server 610.

Figure 7:
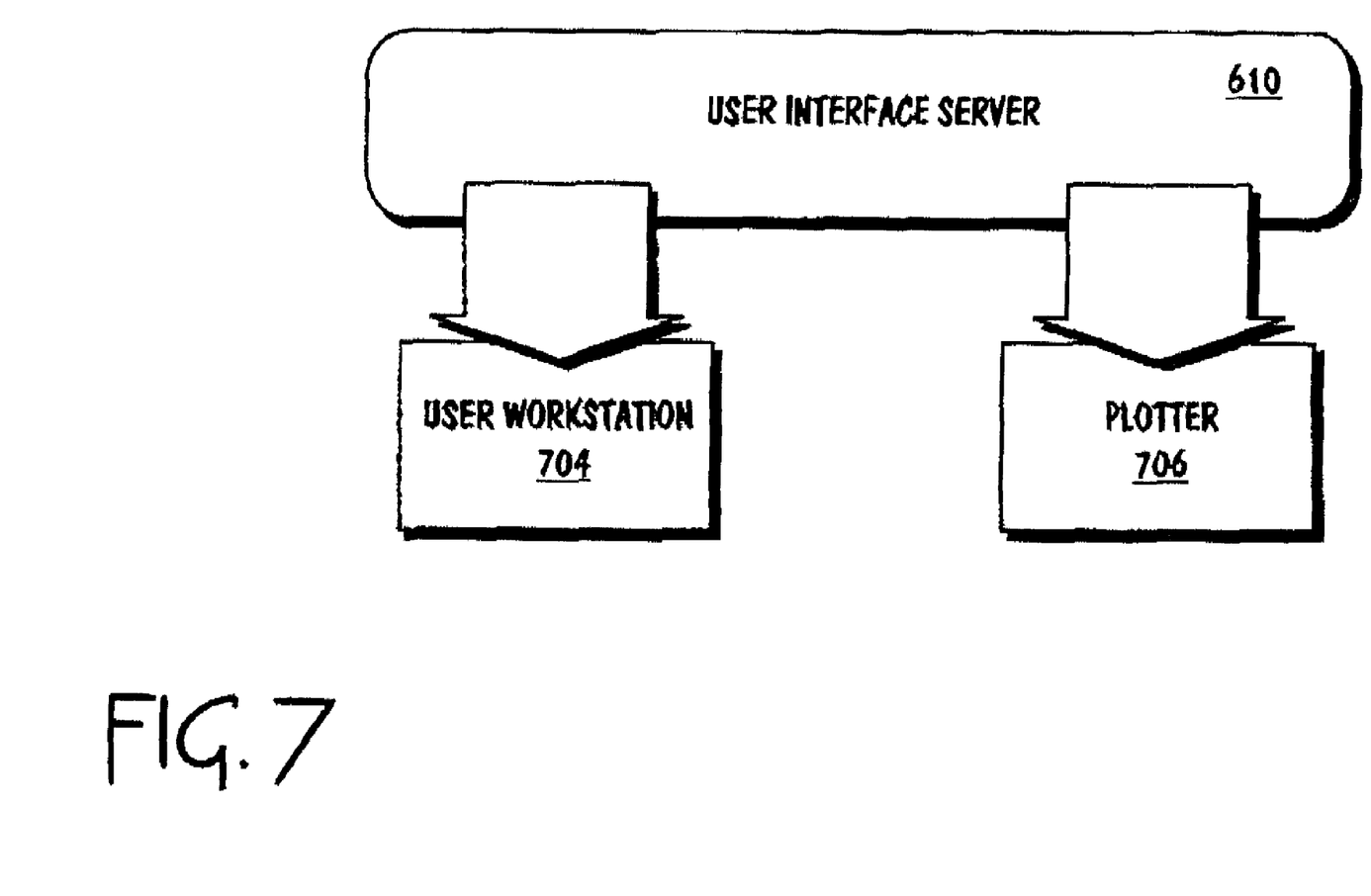
FIG. 7 is a block diagram of a data flow between a server and a workstation and plotter in one embodiment.

FIG. 7 illustrates how a workstation 704 and a plotter 706 communicate with the user interface server 610 in an embodiment.

Figure 8:
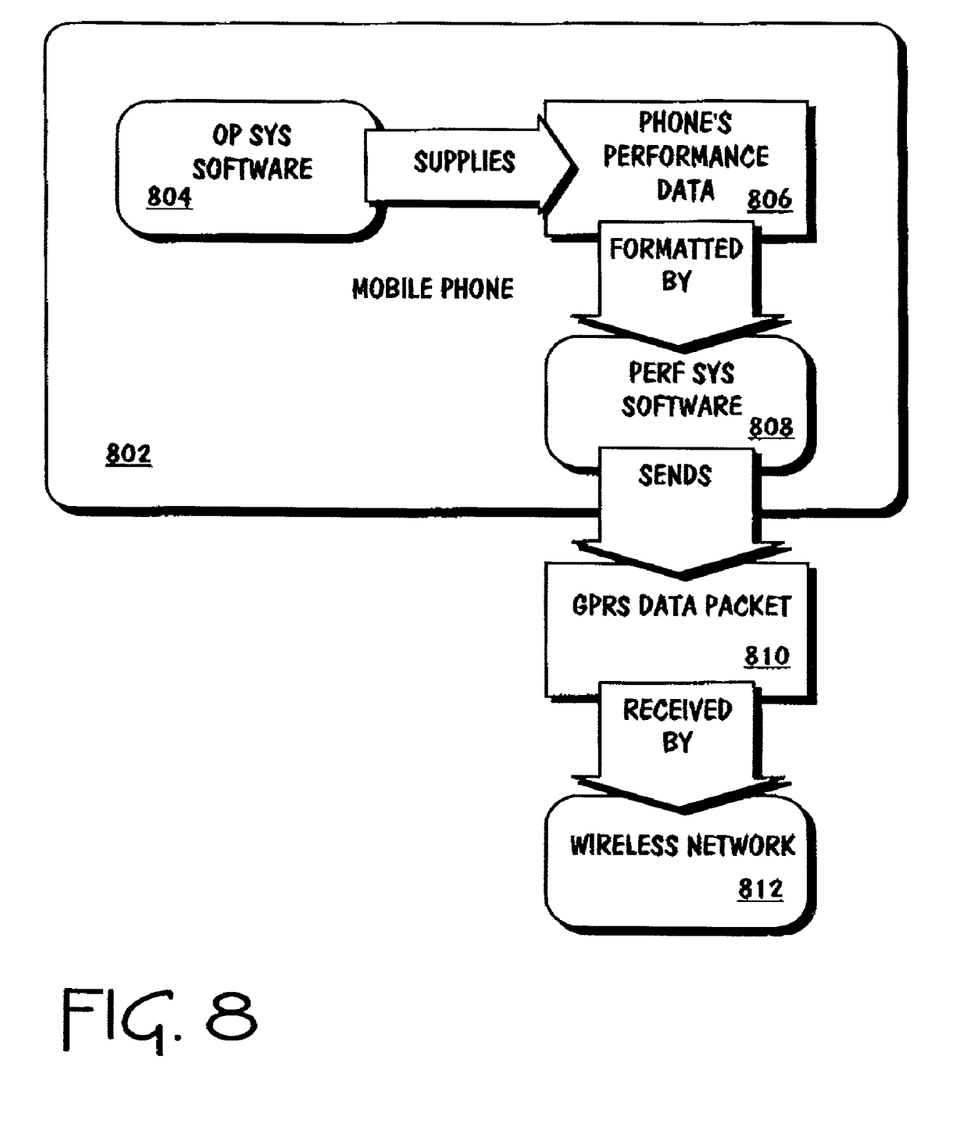
FIG. 8 is a diagram of one embodiment of a mobile unit architecture and data flow.

FIG. 8 is a diagram of one embodiment of a mobile unit architecture and data flow. The data path shown is bidirectional. Each mobile unit registers with the network using its voice MIN-ESN identity, data Internet protocol ("IP") address identity, or some other electronic address. The mobile unit can be enabled or disabled for real-time data collection using this registration mechanism. Selected phones or random phones can be queried for their current status and location. For example, mobile units in a given sector are queried on demand to make performance measurements as needed.

The mobile unit 802 includes operating system software 804 and performance system software 808. The operating software 804 supplies performance data 806, which is formatted by the performance software 808 and sent as a general packet radio service ("GPRS") packet 810 to the wireless network 812. The packet is sent over the GPRS uplink to a location server, periodically through a switch, in the same manner as any other typical GPRS message. Typical messages include registration, paging, control channel, traffic channel, downlink signal strength, neighbor list and signal strength, bit error, time slot, phone mode, and handoff data. The data IP address routes the message to the location server. The location server and the other servers form a private local area network (LAN). In one embodiment, each of these servers uses a high-speed gigabit Ethernet connection with transmission control protocol over Internet protocol ("TCP/IP"). Therefore, the mobile unit uses its GPRS data mode capability (which includes Ethernet-like addressing) to send datagrams containing performance data back to the location server.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the wireless communication system described herein. The various embodiments described herein can be combined to provide further embodiments. These and other changes can be made to the invention in light of the detailed description.

Any references and U.S. patents and applications listed above are incorporated herein by reference. Aspects of the invention can be modified, if necessary, to employ the systems, functions and concepts of any patents and applications described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A subscriber handheld mobile telephone unit for use in a wireless communications network, the handheld mobile telephone unit comprising:
   an operating system, including hardware and software that performs communications functions;
   a performance measurement system to determine at least one call performance characteristic; and
   a global positioning system (GPS) location system, comprising hardware and software that determine a location of the handheld mobile unit in compliance with enhanced 911 ("E911") location resolution requirements, wherein the location system is within the handheld mobile telephone unit carried by the subscriber, and wherein the handheld mobile telephone unit:
   receives a query originating from a mobile switch center which communicates with a base station, wherein the query includes a request for a selected call performance characteristic and location data, the call performance characteristic specified in the query, wherein the location data describes the location of the subscriber handheld mobile telephone unit when the call performance characteristic was collected and comprises a location of the subscriber handheld mobile telephone unit in compliance with the E911 location resolution requirements, the location resolution provided by an enhanced 911 function and the global positioning system location system; and
   transmits the location data and the call performance characteristic to the mobile switch center in response to the request, wherein the location data and the call performance characteristic is used in analyzing performance of the wireless communication network in the absence of drive testing.

2. The mobile unit of claim 1, further comprising a performance monitoring system that monitors and stores multiple network performance characteristic measurements.

3. A method for analyzing a wireless communications network in real-time without drive testing, the method comprising:
   receiving performance monitoring criteria;
   using the performance monitoring criteria to specify a desired performance parameter, querying at least one subscriber handheld mobile telephone unit in the wireless communications network, the handheld mobile telephone unit comprising a global positioning system location system internal to the handheld mobile telephone unit;
   receiving, by a mobile switch center, at least one response to the query, including call data and location data, the call data captured by a mobile switch function, the location data captured by an enhanced 911 technology function, the call data and location data received in the absence of traditional drive testing;
   creating a link between the call data and the location data, link generated by the enhanced 911 technology function;
   storing the call data, the location data, and the link in a server;
   accessing the server to retrieve the call data, the location data, and the links;
   using the call data, the location data and the links to create at least one performance report, including a graphical report that displays the call data as a function of location and time, wherein the location is a location of a subscriber handheld mobile unit hand-carried by a subscriber with a resolution required by enhanced 911 ("E911") services, the location resolution provided by the enhanced 911 function and the global positioning system location system, and the time is a time at which the call data was created and at which the subscriber handheld mobile unit was in the location.

4. The method of claim 3, further comprising automatically adjusting parameters of the wireless communications network based on the at least one performance report and predetermined performance guidelines.

5. The method of claim 4, wherein the parameters include power settings of network components, and frequency assignments.

6. A wireless communications system, comprising:
 a subscriber handheld mobile telephone unit, wherein the handheld mobile telephone unit includes:
  a performance monitoring means that records multiple network performance characteristics; and
  a global positioning system location means, integral to the handheld mobile telephone unit, that creates location data describing a location of the handheld mobile telephone unit with a resolution required by enhanced 911 ("E911") services, the location resolution provided by an enhanced 911 function and the global positioning system location means; and
 a communications switch comprising the enhanced 911 technology function and a mobile switch, wherein the mobile switch captures call data and the enhanced 911 technology function captures the location data, the enhanced 911 technology function creating record links between the call data and the location data; and
 a data processing means in communication with the handheld mobile unit comprising means for using the network performance characteristics and the location data to create at least one performance report, including a graphical report that displays the call data as a function of location and time, wherein the location is the location of the handheld mobile telephone unit hand-carried by a subscriber at the time the network performance characteristics were recorded, and wherein the performance characteristics and location data are acquired in absence of traditional drive testing.

7. The wireless communications system of claim 6, wherein the data processing means further comprises:
 means for receiving performance monitoring criteria;
 means for using the performance monitoring criteria to query the handheld mobile telephone unit; and
 means for receiving a response to the query, wherein the response includes the network performance characteristics and the location data.

8. The wireless communications system of claim 6, wherein the data processing means further comprises:
 means for creating a link between the network performance characteristics and the location data;
 means for storing the network performance characteristics, the location data, and the link in a server; and
 means for retrieving the network performance characteristics and the location data in response to a request to create the at least one performance report.

* * * * *